(12) United States Patent
Wu et al.

(10) Patent No.: US 9,302,593 B2
(45) Date of Patent: Apr. 5, 2016

(54) PROTECTING SWITCH CONTACTS OF RELAY APPARATUS FROM ELECTRICAL ARCING IN ELECTRIC VEHICLE

(71) Applicant: DELTA ELECTRONICS, INC., Taoyuan County (TW)

(72) Inventors: Tsung-Yuan Wu, Taoyuan County (TW); Xin-Wei Liu, Taoyuan County (TW)

(73) Assignee: DELTA ELECTRONICS, INC. (TW)

( * ) Notice: Subject to any disclaimer, the term of this patent is extended or adjusted under 35 U.S.C. 154(b) by 147 days.

(21) Appl. No.: 14/086,172

(22) Filed: Nov. 21, 2013

(65) Prior Publication Data

US 2015/0035485 A1 Feb. 5, 2015

(30) Foreign Application Priority Data

Aug. 2, 2013 (CN) .......................... 2013 1 0334101

(51) Int. Cl.
*B60L 11/18* (2006.01)

(52) U.S. Cl.
CPC ......... *B60L 11/1824* (2013.01); *B60L 11/1816* (2013.01); *B60L 11/1846* (2013.01); *B60L 2210/30* (2013.01)

(58) Field of Classification Search
CPC ............ B60L 11/1824; B60L 11/1816; B60L 11/1846; B60L 2210/30
See application file for complete search history.

(56) References Cited

U.S. PATENT DOCUMENTS

| | | | | |
|---|---|---|---|---|
| 3,474,293 A * | 10/1969 | Siwko et al. | ..................... | 361/13 |
| 3,504,233 A * | 3/1970 | Hurtle | ............................. | 361/13 |
| 3,558,910 A * | 1/1971 | Dale et al. | ..................... | 307/134 |
| 3,974,430 A * | 8/1976 | Tyler et al. | ..................... | 318/473 |
| 4,389,691 A * | 6/1983 | Hancock | ............................ | 361/8 |
| 4,462,057 A * | 7/1984 | Kobayashi et al. | ................ | 361/2 |
| 5,461,531 A * | 10/1995 | Tuchiya et al. | .................. | 361/28 |
| 5,933,304 A * | 8/1999 | Irissou | ............................. | 361/8 |
| 5,952,813 A * | 9/1999 | Ochiai | .......................... | 320/104 |

(Continued)

FOREIGN PATENT DOCUMENTS

| CN | 1317810 | | 10/2001 |
|---|---|---|---|
| CN | 1136593 C | * | 1/2004 |
| CN | 201252522 | | 6/2009 |
| CN | 102336147 | | 2/2012 |
| CN | 102858585 | | 1/2013 |

OTHER PUBLICATIONS

Office Action dated Jan. 21, 2016 from corresponding No. CN 201310334101.8.

*Primary Examiner* — Naum B Levin
(74) *Attorney, Agent, or Firm* — Hauptman Ham, LLP

(57) ABSTRACT

An electric vehicle supply equipment receives an external AC power source. The electric vehicle supply equipment includes a relay apparatus and a controller. The relay apparatus has a master relay, an auxiliary relay, and a controllable switch. The master relay is connected to a master power loop. The controllable switch is connected in series to the auxiliary relay to form a series path and connected to an auxiliary power loop. When the controller detects the external AC power source, the controller turns on the auxiliary relay. Afterward, when the controller detects that the external AC power source is in a zero-crossing condition, the controller drives the controllable switch to be turned on. Accordingly, the relays are controlled in coordinated timing, and further the external AC power source is detected, thus implementing the zero-voltage and zero-current turning on of the relay apparatus.

15 Claims, 7 Drawing Sheets

(56) References Cited

U.S. PATENT DOCUMENTS

| | | | |
|---|---|---|---|
| 6,643,112 B1 * | 11/2003 | Carton et al. | 361/152 |
| 8,129,951 B2 | 3/2012 | Turner et al. | |
| 8,143,843 B2 * | 3/2012 | Ichikawa | 320/104 |
| 8,482,885 B2 * | 7/2013 | Billingsley et al. | 361/8 |
| 9,203,120 B2 | 12/2015 | Kanazawa | |
| 2004/0027734 A1 | 2/2004 | Fairfax et al. | |
| 2008/0143462 A1 | 6/2008 | Belisle et al. | |
| 2013/0069425 A1 * | 3/2013 | Kanazawa | 307/9.1 |

* cited by examiner

PROTECTING SWITCH CONTACTS OF RELAY APPARATUS FROM ELECTRICAL ARCING IN ELECTRIC VEHICLE

BACKGROUND

1. Technical Field

The present disclosure relates generally to a supply equipment and a method of operating the same, and more particularly to an electric vehicle supply equipment and a method of operating the same.

2. Description of Related Art

With the advancement of the electric vehicles, the supply and demand of the electric vehicle supply equipment (EVSE) are constantly growing. In particular, the supply equipment for electric vehicles is divided into two parts, namely the DC electric vehicle supply equipment and the AC electric vehicle supply equipment.

With respect to the AC electric vehicle supply equipment, the power output loop thereof has switch components, which are relays or contactors. In general, the high inrush current would be produced when the relays or the contactors are closed so that the relays or the contactors are damaged to reduce life time thereof.

The AC electric vehicle supply equipment is provided to supply power to the vehicle charging apparatus. For the AC electric vehicle supply equipment, the condition of load current is complicated when contacts of the relays or the contactors are closing. Reference is made to FIG. 1 which is a schematic view of using a related art electric vehicle supply equipment to charge an on-board charging apparatus. In general, a vehicle charging apparatus 202A inside the electric vehicle 20A has an input capacitor Ci connected to an input terminal thereof. The input capacitor Ci of the vehicle charging apparatus 202A is first connected to the electric vehicle supply equipment 10A when the electric vehicle supply equipment 10A supplies power to the vehicle charging apparatus 202A. Because of the capacitive load, the electric vehicle supply equipment 10 would output a high inrush current so as to damage contacts of the relays 102A, 104A or contactors inside the electric vehicle supply equipment 10A.

Relays are commonly applied to the power electronic applications, and high inrush current would be produced to stick the contacts of the relays. In particular, the contact bounce conditions are easily to arise for the mechanical relays while the contacts are closing. Accordingly, it is to cause malfunction of controlling the relays, reduce the life time of the relays, and even to harm personal safety. In addition, the majority of the relays do not have functions of displaying conditions of the contacts, such as open/close conditions or normal/abnormal conditions because of the size limitation of the relay. Therefore, in practice there is indeed a considerable degree of security concerns.

Accordingly, it is desirable to provide an electric vehicle supply equipment and a method of operating the same to control the provided relays in coordinated timing, and detect the external AC power source to implement the zero-voltage and zero-current turning on so as to protect the switch contacts of the relay apparatus from the electrical arcing caused of closing the switch contacts and protect the switches of the relay apparatus by softly switching the switches.

SUMMARY

An object of the present disclosure is to provide an electric vehicle supply equipment to solve the above-mentioned problems. Accordingly, the electric vehicle supply equipment receives an external AC power source and the electric vehicle supply equipment includes a relay apparatus and a controller. The relay apparatus includes at least one master relay, an auxiliary relay, and a controllable switch. The at least one master relay is connected to a master power loop. The controllable switch is connected in series to the auxiliary relay to form a series branch, and is connected to an auxiliary power loop. The series branch is connected in parallel to the at least one master relay. The controller produces at least one master control signal, an auxiliary control signal, and a trigger control signal to correspondingly control the at least one master relay, the auxiliary relay, and the controllable switch. When the controller detects the external AC power source, the auxiliary control signal turns on the auxiliary relay, and then the external AC power source supplies power to an electric vehicle through the auxiliary power loop when the controller controls the trigger control signal to turn on the controllable switch.

Another object of the present disclosure is to provide a method of operating an electric vehicle supply equipment to solve the above-mentioned problems. Accordingly, the electric vehicle supply equipment receives an external AC power source and the method includes following steps: (a) providing a relay apparatus; wherein the relay apparatus has at least one master relay, an auxiliary relay, and a controllable switch; the at least one master relay is connected to a master power loop, and the auxiliary relay is connected in series to the controllable switch to form a series branch and connected to an auxiliary power loop; (b) providing a controller; wherein the controller is configured to produce at least one master control signal, an auxiliary control signal, and a trigger control signal to correspondingly control the at least one master relay, the auxiliary relay, and the controllable switch; (c) turning on the auxiliary relay by the auxiliary control signal when the controller is configured to detect the external AC power source; and (d) supplying power to an electric vehicle by the external AC power source through the auxiliary power loop when the controller is configured to control the trigger control signal to turn on the controllable switch.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The features of the present disclosure believed to be novel are set forth with particularity in the appended claims. The present disclosure itself, however, may be best understood by reference to the following detailed description of the present disclosure, which describes an exemplary embodiment of the present disclosure, taken in conjunction with the accompanying drawings, in which:

DETAILED DESCRIPTION

Figure 1:
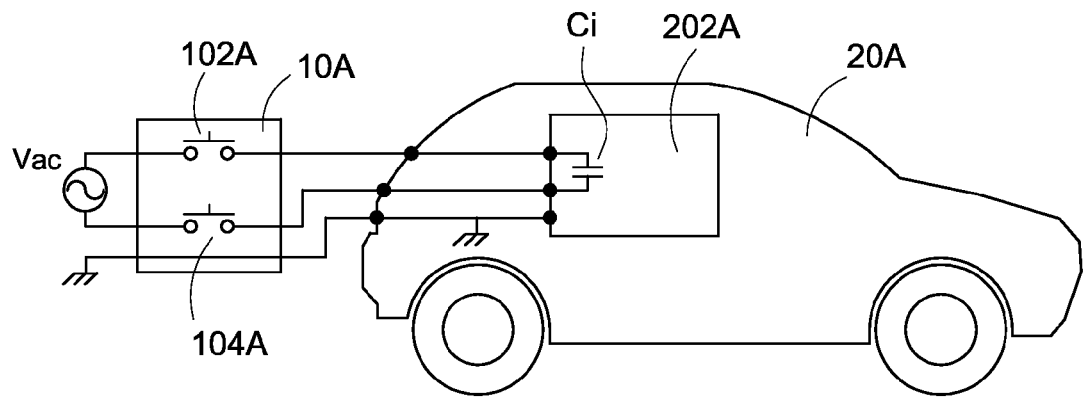
FIG. 1 is a schematic view of using a related art electric vehicle supply equipment to charge an on-board charging apparatus.

Reference will now be made to the drawing figures to describe the present invention in detail.

Figure 2A:
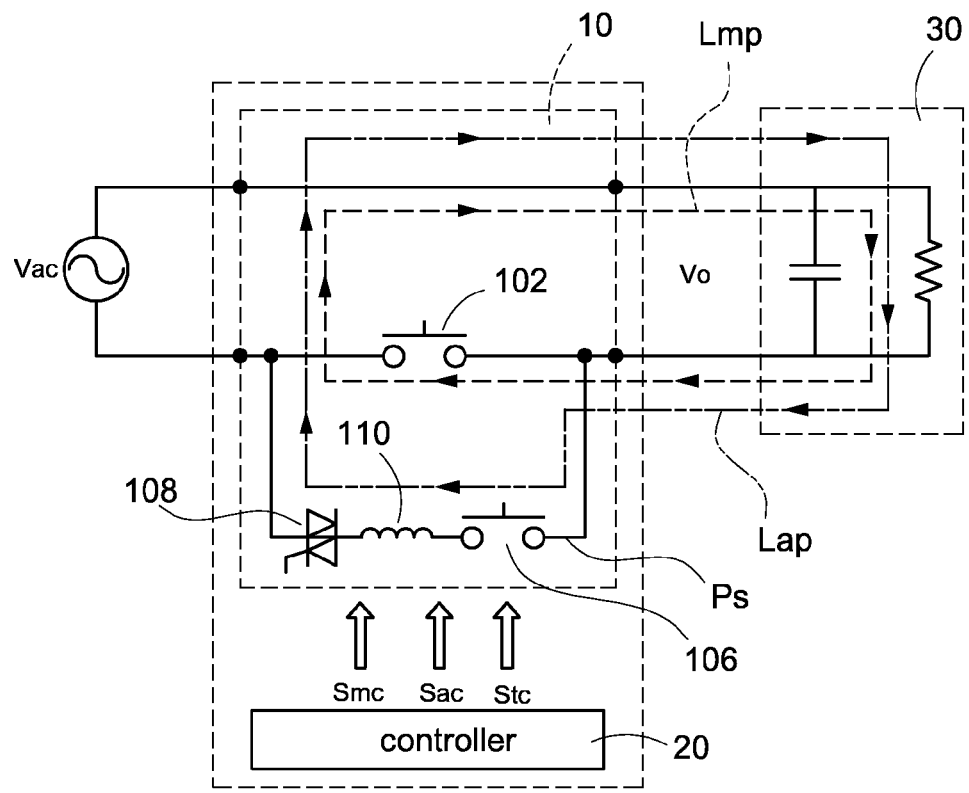
FIG. 2A is a schematic circuit diagram of an electric vehicle supply equipment according to a first embodiment of the present disclosure.

Reference is made to FIG. 2A which is a schematic circuit diagram of an electric vehicle supply equipment according to a first embodiment of the present disclosure. The electric vehicle supply equipment receives an external AC power source Vac. In particular, the electric vehicle supply equipment is a charging station for an electric vehicle 30. The electric vehicle supply equipment includes a relay apparatus 10 and a controller 20. In this embodiment, the relay apparatus 10 has a master relay 102, an auxiliary relay 106, and a controllable switch 108. In particular, the controllable switch 108 is a silicon controlled rectifier (SCR), a triode AC semiconductor switch (TRIAC), or a diode for AC switch (DIAC). However, the embodiments are only exemplified but are not intended to limit the scope of the disclosure. In this embodiment, the TRIAC is exemplified as the controllable switch 108 to further demonstrate the present invention. The master relay 102 is connected to a master power loop Lmp. The controllable switch 108 is connected in series to the auxiliary relay 106 to form a series branch Ps, and connected to an auxiliary power loop Lap. The master relay 102 is connected to an output terminal of the master power loop Lmp, and the series branch Ps is connected in parallel to the master relay 102. In this embodiment, the single-phase power system is exemplified as the external AC power source Vac to demonstrate the present invention. However, the embodiment is only exemplified but is not intended to limit the scope of the disclosure. That is, the electric vehicle supply equipment can be operated in the three-phase power system and the detailed operation of the electric vehicle supply equipment will be described hereinafter as follows. In this embodiment, the controller 20 produces a master control signal Smc, an auxiliary control signal Sac, and a trigger control signal Stc. The master control signal Smc is used to control the master relay 102, the auxiliary control signal Sac is used to control the auxiliary relay 106, and the trigger control signal Stc is used to control the controllable switch 108.

Figure 2B:
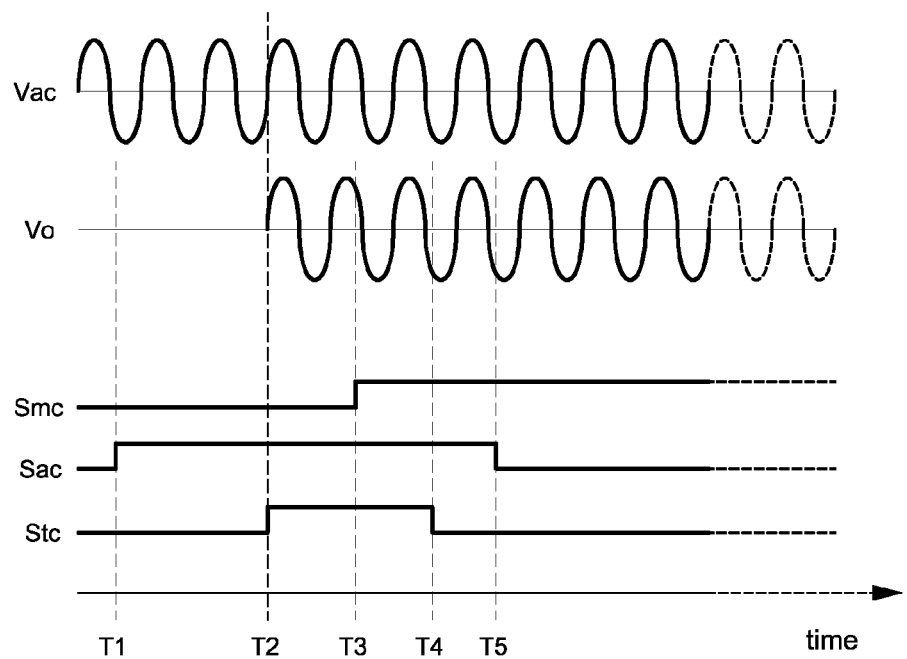
FIG. 2B is a timing diagram of controlling the electric vehicle supply equipment according to the first embodiment of the present disclosure.

Reference is made to FIG. 2B which is a timing diagram of controlling the electric vehicle supply equipment according to the first embodiment of the present disclosure. After the electric vehicle supply equipment receives the external AC power source Vac and the electric vehicle 30 is connected to the electric vehicle supply equipment, the controller 20 detects the external AC power source Vac and the auxiliary control signal Sac produced from the controller 20 is converted from the low level to the high level at the time T1, thus turning on the auxiliary relay 106. At this time, an output voltage Vo produced from the electric vehicle supply equipment is zero because there is no any output power loop is established. At the time T2, the trigger control signal Stc produced from the controller 20 is converted from the low level to the high level when the controller 20 detects that the external AC power source Vac is in the zero-crossing condition, thus turning on the controllable switch 108 so that the external AC power source Vac can supply power to the electric vehicle 30 through the auxiliary power loop Lap. At this time, the output voltage Vo produced from the electric vehicle supply equipment is equal to the external AC power source Vac because the output power loop is established. Accordingly, the master relay 102 and the auxiliary relay 106 are controlled in coordinated timing, and further the external AC power source Vac is detected, thus implementing the zero-voltage turning on and the zero-current turning on of the relay apparatus 10 to minimize the output current of the electric vehicle and softly switch the switches of the relay apparatus 10.

According to the above-mentioned descriptions, the controllable switch 108 is controlled to turn on or not depending on whether the external AC power source Vac is in the zero-crossing condition detected by the controller 20 or not. However, the zero-voltage turning on of the circuit can be realized even though the controller 20 triggers to turn on the controllable switch 108 when the external AC power source Vac is not in a zero-crossing condition. In addition, the zero-current turning on of the circuit can be realized when the controller 20 triggers to turn on the controllable switch 108 when the external AC power source Vac is in the zero-crossing condition. Accordingly, both the zero-voltage turning on and the zero-current turning on are realized to operate the relay apparatus 10 by providing the corresponding timing controls to control the relays and the controllable switches. Because the controllable switch 108 is the triode AC semiconductor switch (TRIAC), the trigger control signal Stc produced from the controller 20 is provided to trigger the gate of the TRIAC and turn on the TRIAC when the controller 20 detects that the external AC power source Vac is in the zero-crossing condition.

At the time T3, the master control signal Smc is converted from the low level to the high level to turn on the master relay 102. Afterward, the trigger control signal Stc is converted from the high level to the low level to turn off the controllable switch 108 at the time T4. Afterward, the auxiliary control signal Sac is converted from the high level to the low level to turn off the auxiliary relay 106 at the time T5 so that the external AC power source Vac can supply power to the electric vehicle 30 through the master power loop Lmp.

Especially, the level conversions of turning on and turning off the master relay 102, the auxiliary relay 106, and the controllable switch 108 by the master control signal Smc, the auxiliary control signal Sac, and the trigger control signal Stc, respectively, are not limited to the relationship between the high level and low level but provide according to the actual operations of the master relay 102, the auxiliary relay 106, and the controllable switch 108. In addition, the relay apparatus 10 further has an inductance element 110. The inductance element 110 is connected in series to the series branch Ps formed by the controllable switch 108 and the auxiliary relay 106 to restrain a changing rate of the current flowing through the auxiliary power loop Lap when the controllable switch 108 is turned on by the trigger control signal Stc. Various substitutions like the inductance element 110 can be used to achieve the function; however, other equivalent electronic components can be used instead of the inductance element 110 for restraining the changing rate of the current flowing through the auxiliary power loop Lap. Especially, the inductance element 110 or the equivalent electronic component is optional. Accordingly, the operations of controlling the relays 102, 106 and detecting the external AC power source Vac are unaffected despite the absence of the inductance element 110 or other equivalent electronic component.

Figure 3A:
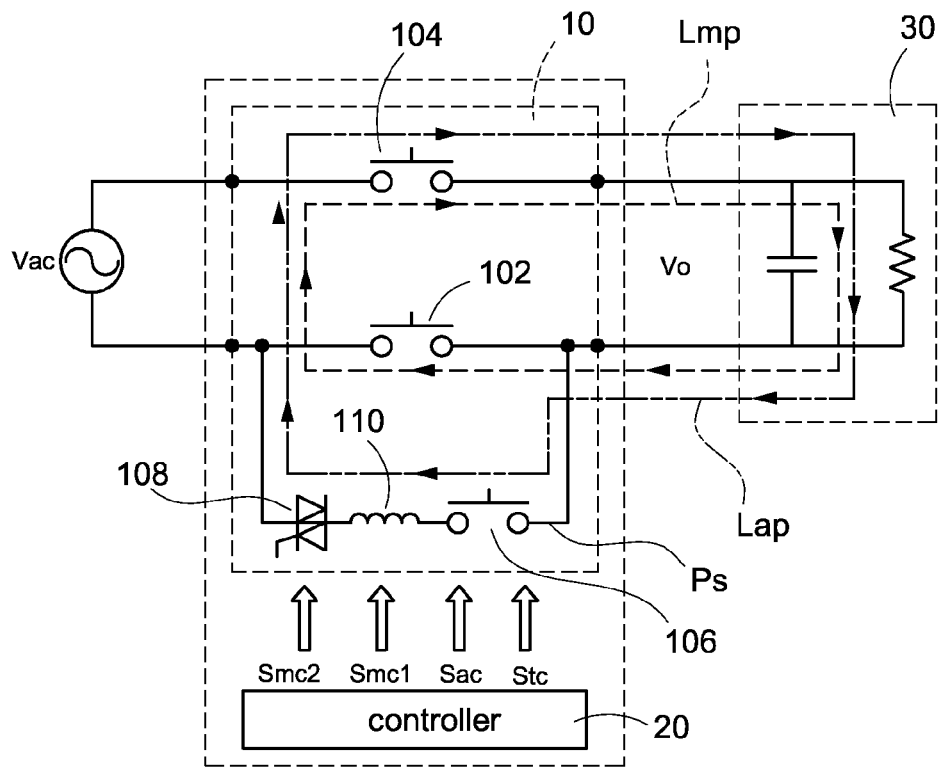
FIG. 3A is a schematic circuit diagram of an electric vehicle supply equipment according to a second embodiment of the present disclosure.

Reference is made to FIG. 3A which is a schematic circuit diagram of an electric vehicle supply equipment according to a second embodiment of the present disclosure. The electric vehicle supply equipment receives an external AC power source Vac. The major difference between the embodiment and the first embodiment referred to FIG. 2A is that the amount of the master relay is two, namely, a first master relay 102 and a second master relay 104. Also, the first master relay 102 is controlled by a first master control signal Smc1 and the second master relay 104 is controlled by a second master control signal Smc2. The first master relay 102 is connected to an output terminal of the master power loop Lmp, and the series branch Ps is connected in parallel to the first master relay 102; and the second master relay 104 is connected to the other output terminal of the master power loop Lmp.

Figure 3B:
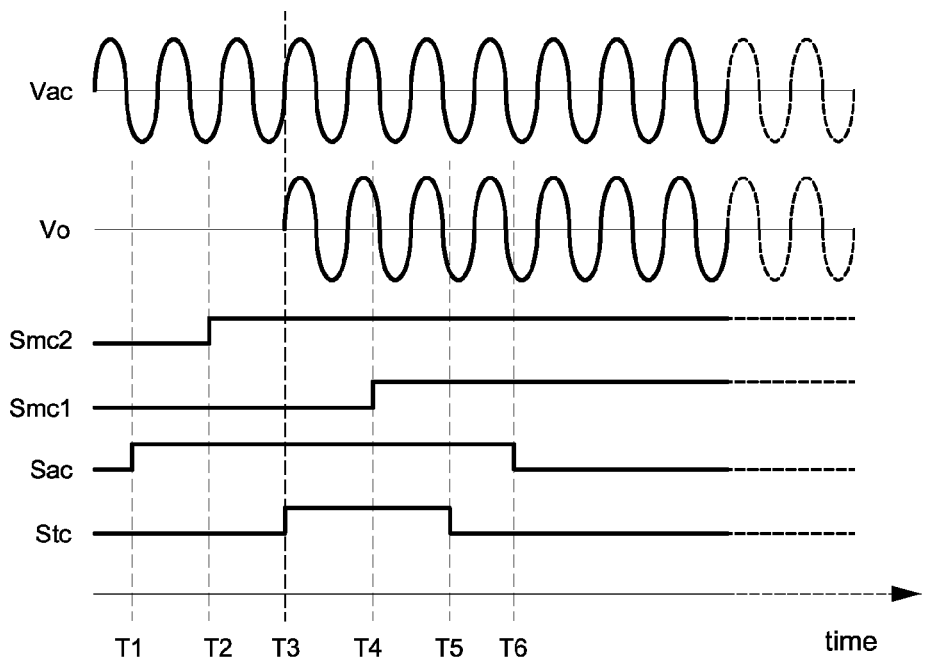
FIG. 3B is a timing diagram of controlling the electric vehicle supply equipment according to the second embodiment of the present disclosure.

Reference is made to FIG. 3B which is a timing diagram of controlling the electric vehicle supply equipment according to the second embodiment of the present disclosure. After the electric vehicle supply equipment receives the external AC power source Vac and the electric vehicle 30 is connected to the electric vehicle supply equipment, the controller 20 detects the external AC power source Vac and the auxiliary control signal Sac produced from the controller 20 is converted from the low level to the high level at the time T1, thus turning on the auxiliary relay 106. At this time, an output voltage Vo produced from the electric vehicle supply equipment is zero because there is no any output power loop is established. At the time T2, the second master control signal Smc2 produced from the controller 20 is converted from the low level to the high level to turn on the second master relay 104. At the time T3, the trigger control signal Stc produced from the controller 20 is converted from the low level to the high level when the controller 20 detects that the external AC power source Vac is in the zero-crossing condition, thus turning on the controllable switch 108 so that the external AC power source Vac can supply power to the electric vehicle 30 through the auxiliary power loop Lap. At this time, the output voltage Vo produced from the electric vehicle supply equipment is equal to the external AC power source Vac because the output power loop is established. Accordingly, the first master relay 102, the second master relay 104, and the auxiliary relay 106 are controlled in coordinated timing, and further the external AC power source Vac is detected, thus implementing the zero-voltage turning on and the zero-current turning on of the relay apparatus 10 to minimize the output current of the electric vehicle and softly switch the switches of the relay apparatus 10.

At the time T4, the first master control signal Smc1 is converted from the low level to the high level to turn on the first master relay 102. Afterward, the trigger control signal Stc is converted from the high level to the low level to turn off the controllable switch 108 at the time T5. Afterward, the auxiliary control signal Sac is converted from the high level to the low level to turn off the auxiliary relay 106 at the time T6 so that the external AC power source Vac can supply power to the electric vehicle 30 through the master power loop Lmp.

Especially, the level conversions of turning on and turning off the first master relay 102, the second master relay 104, the auxiliary relay 106, and the controllable switch 108 by the first master control signal Smc1, the second master control signal Smc2, the auxiliary control signal Sac, and the trigger control signal Stc, respectively, are not limited to the relationship between the high level and low level but provide according to the actual operations of the first master relay 102, the second master relay 104, the auxiliary relay 106, and the controllable switch 108. In addition, the relay apparatus 10 further has an inductance element 110. The inductance element 110 is connected in series to the series branch Ps formed by the controllable switch 108 and the auxiliary relay 106 to restrain a changing rate of the current flowing through the auxiliary power loop Lap when the controllable switch 108 is turned on by the trigger control signal Stc. Various substitutions like the inductance element 110 can be used to achieve the function; however, other equivalent electronic components can be used instead of the inductance element 110 for restraining the changing rate of the current flowing through the auxiliary power loop Lap. Especially, the inductance element 110 or the equivalent electronic component is optional. Accordingly, the operations of controlling the relays 102, 104, 106 and detecting the external AC power source Vac are unaffected despite the absence of the inductance element 110 or other equivalent electronic component.

Figure 3C:
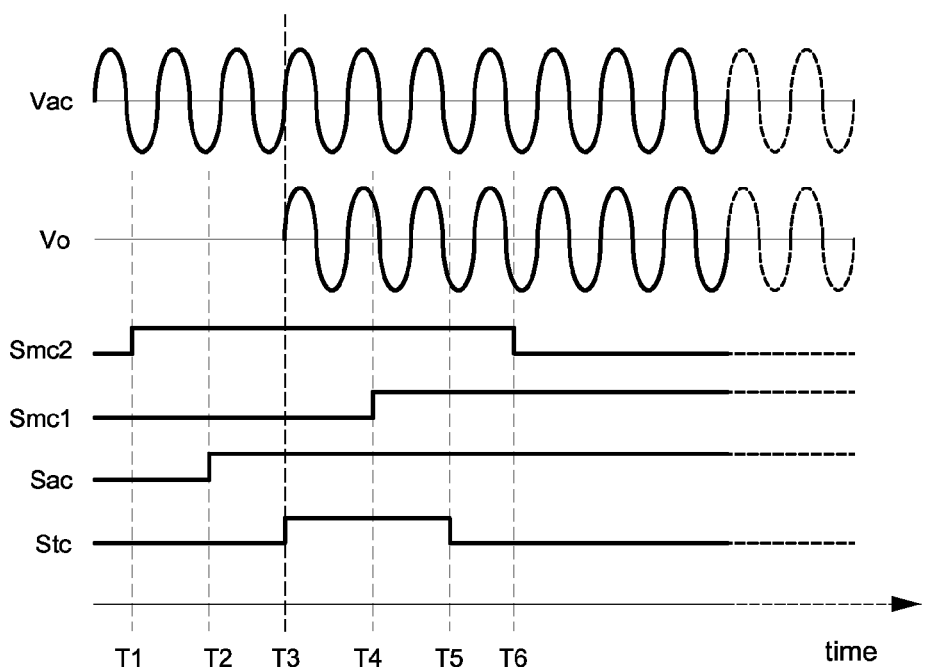
FIG. 3C is another timing diagram of controlling the electric vehicle supply equipment according to the second embodiment of the present disclosure.

Reference is made to FIG. 3C which is another timing diagram of controlling the electric vehicle supply equipment according to the second embodiment of the present invention. The major difference between the embodiment and the second embodiment referred to FIG. 3B is that the conduction sequence of the auxiliary relay 106 and the second master relay 104 is different. That is, in the second embodiment, the auxiliary relay 106 is turned on at the time T1 and the second master relay 104 is turned on at the time T2. Because the controllable switches 108 are turned on at the time T3, the first master relays 102 are turned on at the time T4, the controllable switches 108 are turned off at the time T5, and the auxiliary relays 106 are turned off at the time T6 in the two embodiments, the detail description of this embodiment is omitted here for conciseness.

Figure 4A:
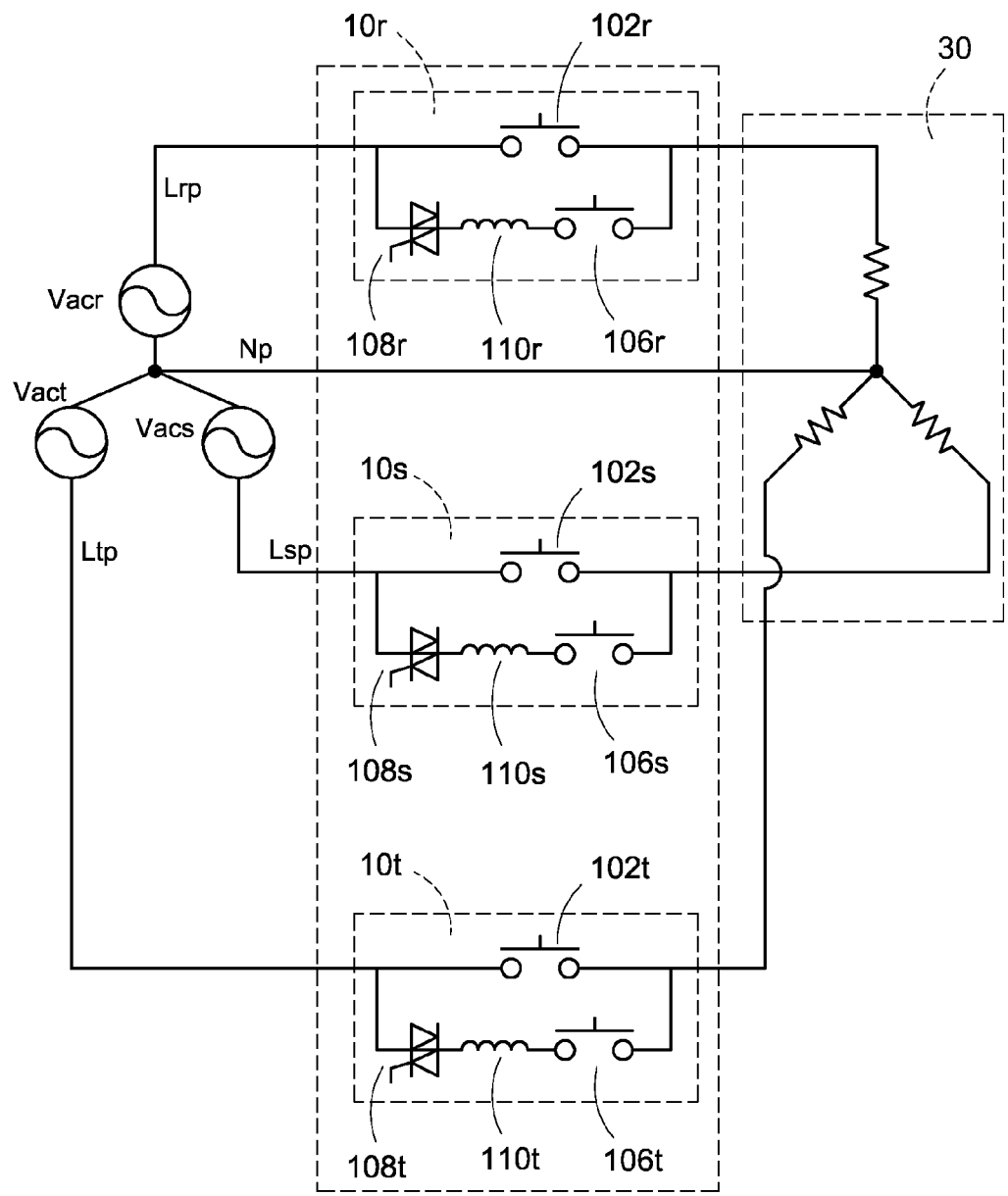
FIG. 4A is a schematic circuit diagram of an electric vehicle supply equipment according to a third embodiment of the present disclosure.

Reference is made to FIG. 4A which is a schematic circuit diagram of an electric vehicle supply equipment according to a third embodiment of the present disclosure. The major difference between the embodiment and the first embodiment referred to FIG. 2A is that the electric vehicle supply equipment is operated in the three-phase four-wire (3Φ4 W) power system and each phase of the power system is electrically connected to one relay apparatus, namely, a R-phase relay apparatus 10r, a S-phase relay apparatus 10s, and a T-phase relay apparatus 10t. In this embodiment, the R-phase relay apparatus 10r is exemplified for further demonstration. As shown in FIG. 2A, the R-phase relay apparatus 10r includes a master relay 102r, an auxiliary relay 106r, a controllable switch 108r, and further an inductance element 110r. Similarly, the controller (not shown) produces a mater control signal, an auxiliary control signal, and a trigger control signal. The mater control signal is used to control the master relay, the auxiliary control signal is used to control the auxiliary relay, and the trigger control signal is used to control the controllable switch. Furthermore, the T-phase relay apparatus 10t and the R-phase relay apparatus 10r have the relays, the controllable switches, and the inductance elements like to the S-phase relay apparatus 10s, and the controller is also provided to control the relays, the controllable switches by the control signals produced from the controller. Comparing to the above-mentioned operations and control timings of the electric vehicle supply equipment applied to the single-phase power source, the controller respectively controls the R-phase relay apparatus, the S-phase relay apparatus, and the T-phase relay apparatus to establish the auxiliary power loop and the master power loop. In addition, the controllable switches are triggered when the corresponding AC power source is in a zero-crossing condition so that the AC power source is used to supply power to the electric vehicle through the auxiliary power loop. Accordingly, both the zero-voltage turning on and the zero-current turning on are realized to minimize the output current of the electric vehicle and softly switch the switches of the relay apparatuses, thus protecting the relay apparatuses. Further, the auxiliary power loop is converted into the master power loop to supply power to the electric vehicle after the power supply is stable.

Figure 4B:
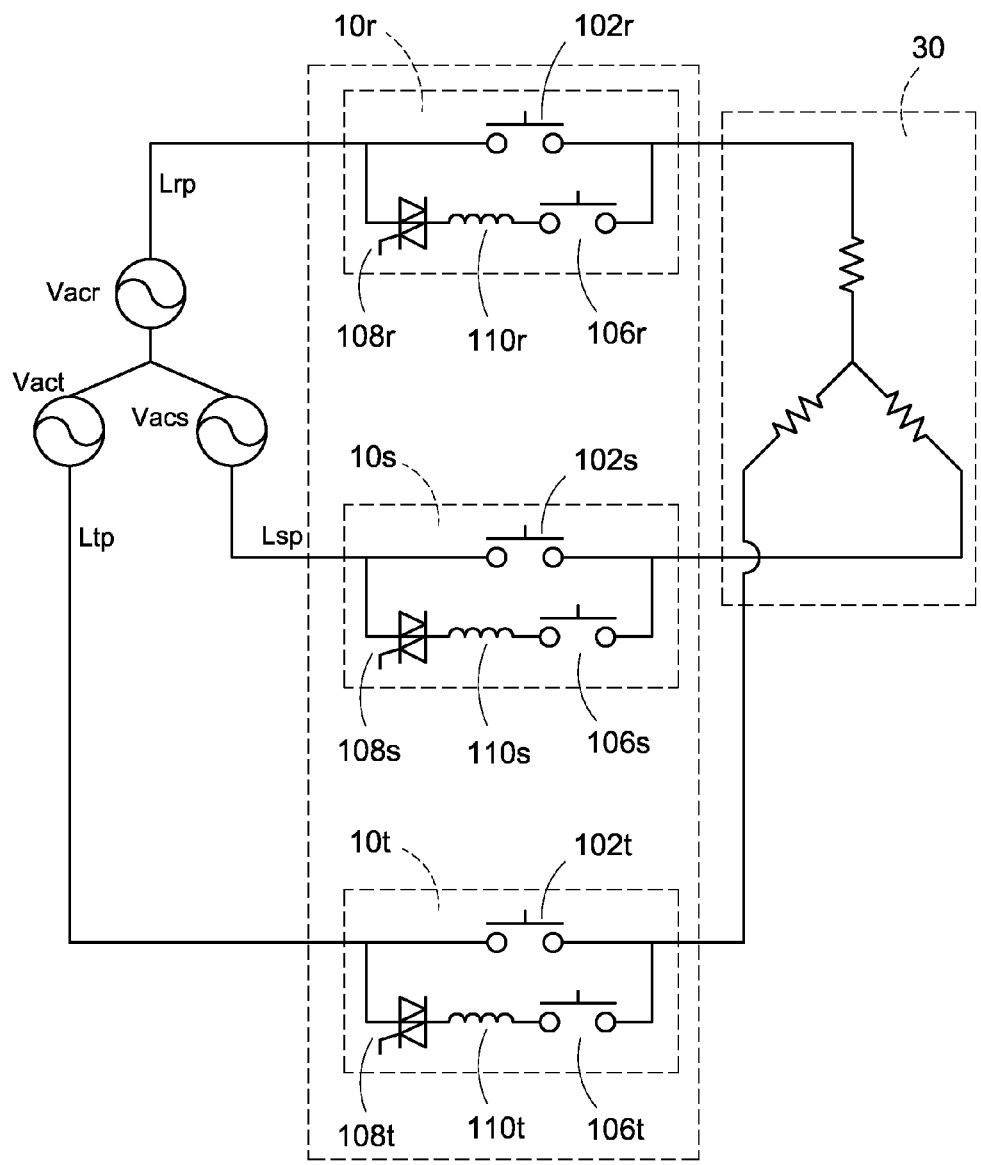
FIG. 4B is a schematic circuit diagram of an electric vehicle supply equipment according to a fourth embodiment of the present disclosure.
Figure 4C:
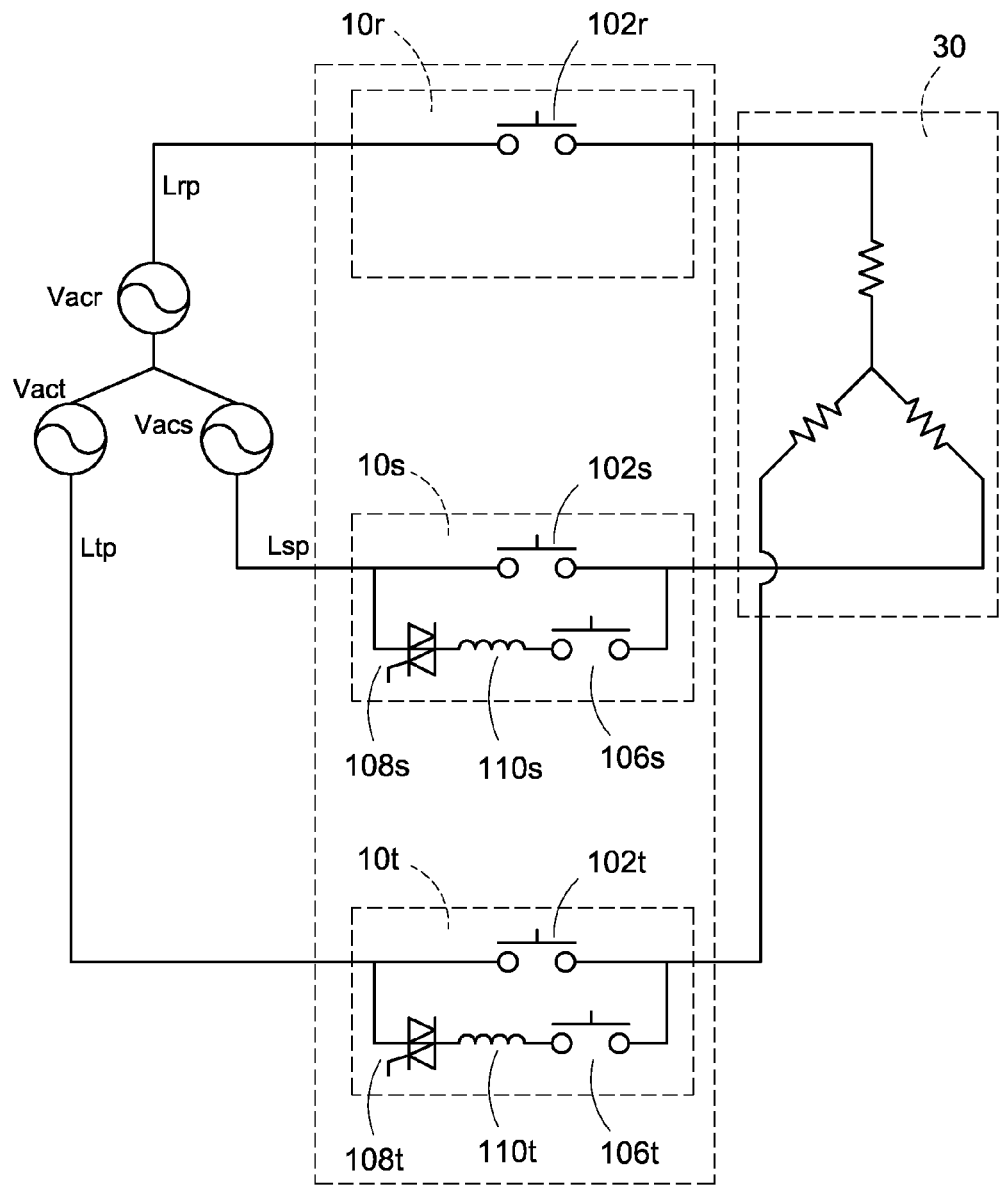
FIG. 4C is a schematic circuit diagram of an electric vehicle supply equipment according to a fifth embodiment of the present disclosure.

Reference is made to FIG. 4B and FIG. 4C which are a schematic circuit diagram of an electric vehicle supply equipment according to a fourth embodiment and a fifth embodiment of the present disclosure, respectively. Comparing to the third embodiment shown in FIG. 4A, the electric vehicle supply equipment is operated in the three-phase three-wire (3Φ3 W) power source. In the fourth embodiment (shown in FIG. 4B), each phase of the power source is electrically connected to a relay apparatus. In the fifth embodiment (shown in FIG. 4C), two phases of the power source, such as the S phase and the T phase in this embodiment, are electrically connected to the completed relay apparatuses, namely the master relays 102s, 102t, the auxiliary relays 106s, 106t, the controllable switches 108s, 108t, and the inductance elements 110s, 110t, but the other phase of the power source, such as the R phase, is electrically connected to the simple relay apparatus, namely only the master relay 102r. In the above-mentioned two circuit topologies, the R-phase relay apparatus, the S-phase relay apparatus, and the T-phase relay apparatus are controlled to establish the auxiliary power loop and the master power loop. In addition, the controllable switches are triggered when the corresponding AC power source is in a zero-crossing condition so that the AC power source is used to supply power to the electric vehicle through the auxiliary power loop. Accordingly, both the zero-voltage turning on and the zero-current turning on are realized to minimize the output current of the electric vehicle and softly switch the switches of the relay apparatuses, thus protecting the relay apparatuses. Further, the auxiliary power loop is converted into the master power loop to supply power to the electric vehicle after the power supply is stable.

Figure 5:
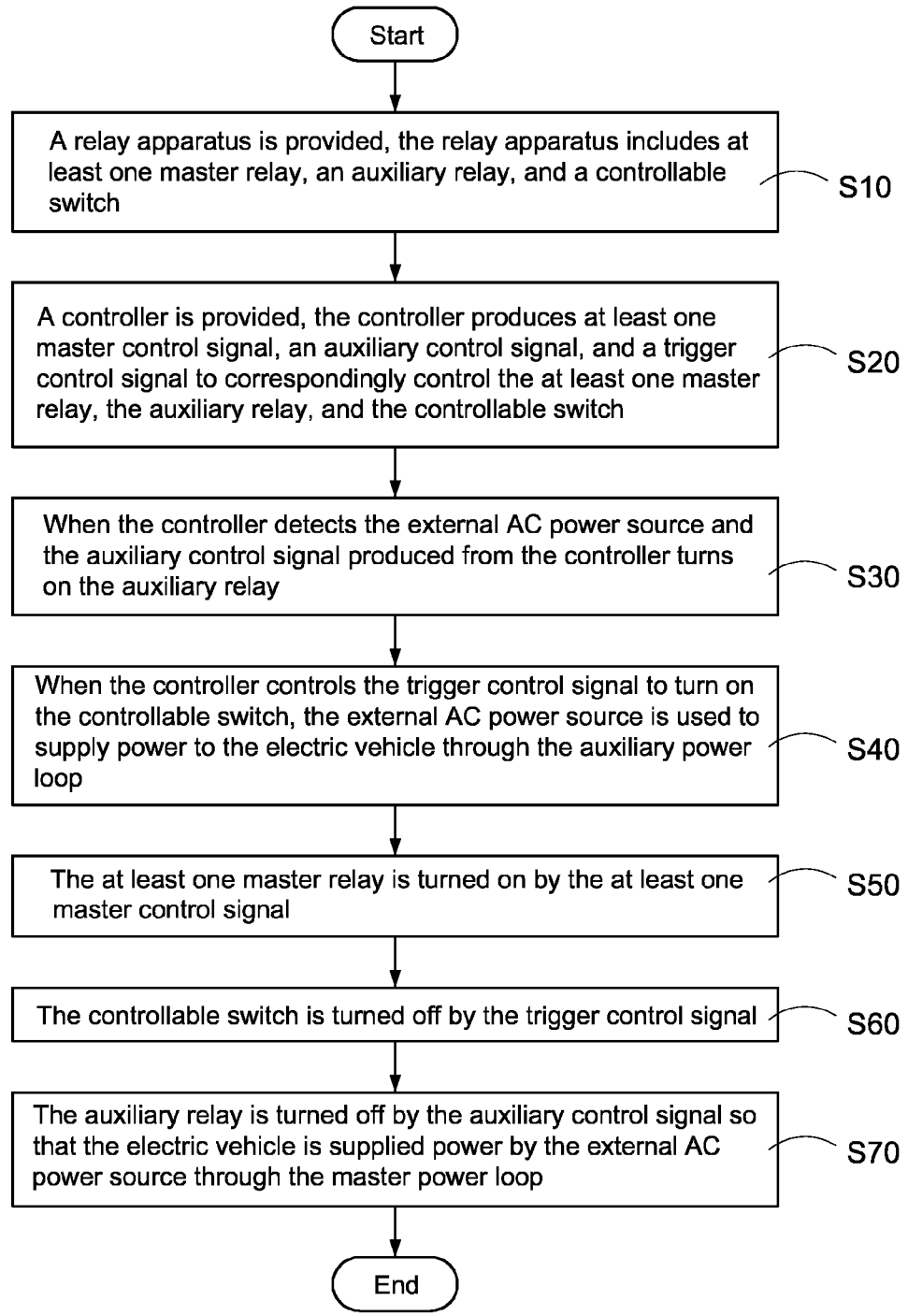
FIG. 5 is a flowchart of a method of operating an electric vehicle supply equipment according to the present disclosure.

Reference is made to FIG. 5 which is a flowchart of a method of operating an electric vehicle supply equipment according to the present disclosure. The electric vehicle supply equipment receives an external AC power source. The method includes the following steps: First, a relay apparatus is provided, the relay apparatus includes at least one master relay, an auxiliary relay, and a controllable switch (S10). The at least one master relay is connected to a master power loop, and the auxiliary relay is connected in series to the controllable switch to form a series branch and connected to an auxiliary power loop. In particular, the controllable switch is a silicon controlled rectifier (SCR), a triode AC semiconductor switch (TRIAC), or a diode for AC switch (DIAC). However, the embodiments are only exemplified but are not intended to limit the scope of the disclosure. Afterward, a controller is provided, the controller produces at least one master control signal, an auxiliary control signal, and a trigger control signal to correspondingly control the at least one master relay, the auxiliary relay, and the controllable switch (S20). Especially, when the amount of the master relay is one and the master control signal is provided to correspondingly control the master relay, the master relay is connected to an output terminal of the master power loop, and the series branch is connected in parallel to the master relay. In addition, when the amount of the master relay is two, namely a first master relay and a second master relay, and the first master relay and the second master relay are controlled by a first master control signal and a second master control signal, respectively, the first master relay is connected to an output terminal of the master power loop, and the series branch is connected in parallel to the first master relay; and the second master relay is connected to the other output terminal of the master power loop.

After the electric vehicle supply equipment receives the external AC power source and the electric vehicle is connected to the electric vehicle supply equipment, the controller detects the external AC power source and the auxiliary control signal produced from the controller turns on the auxiliary relay (S30). When the controller controls the trigger control signal to turn on the controllable switch, the external AC power source is used to supply power to the electric vehicle through the auxiliary power loop (S40). The controller triggers to turn on the controllable switch when the external AC power source is not in a zero-crossing condition so that the zero-voltage turning on of the relay apparatus is achieved and the external AC power source is provided to supply power to the electric vehicle through the auxiliary power loop. The controller triggers to turn on the controllable switch when the external AC power source is in a zero-crossing condition so that the zero-current turning on of the relay apparatus is achieved and the external AC power source is provided to supply power to the electric vehicle through the auxiliary power loop. Afterward, the at least one master relay is turned on by the at least one master control signal (S50). Especially, when the amount of the master relay is one, the master relay is controlled by the master control signal. When the amount of the master relay is two, the first master relay is controlled by the first master control signal, and the second master relay is controlled by the second master control signal (S30') before the step (S40). Especially, the sequence of the step (S30) and the step (S30') can be adjusted, that is, the step of turning on the second master relay by the second master control signal can be earlier than the step of turning on the auxiliary relay by the auxiliary control signal. Afterward, the controllable switch is turned off by the trigger control signal (S60). Finally, the auxiliary relay is turned off by the auxiliary control signal so that the electric vehicle is supplied power by the external AC power source through the master power loop (S70). In addition, in the step (S10), the relay apparatus further has an inductance element. The inductance element is connected in series to the series branch formed by the controllable switch and the auxiliary relay to restrain a changing rate of the current flowing through the auxiliary power loop when the controllable switch is turned on by the trigger control signal. Various substitutions like the inductance element can be used to achieve the function; however, other equivalent electronic components can be used instead of the inductance element restraining the changing rate of the current flowing through the auxiliary power loop. Especially, the inductance element or the equivalent electronic component is optional. Accordingly, the operations of controlling the relays and detecting the external AC power source are unaffected despite the absence of the inductance element or other equivalent electronic component.

In conclusion, the present disclosure has following advantages:

1. The auxiliary power loop Lap is first established to transmit output power to supply power to the electric vehicle 30, and then the master power loop Lmp is established to transmit output power to supply power to the electric vehicle 30 so that the relay apparatus 10 of the electric vehicle supply equipment can normally supply power under the condition of stably closing the switch contacts, thus protecting the switch contacts of the relay apparatus 10 from the electrical arcing caused of closing the switch contacts;

2. The controller 20 triggers to turn on the controllable switch 108 when the external AC power source Vac is not in a zero-crossing condition so that the zero-voltage turning on of the relay apparatus 10 is achieved. Furthermore, the controller 20 triggers to turn on the controllable switch 108 when the controller 20 detects that the AC power source Vac is in a zero-crossing condition so that the AC power source Vac can supply power to the electric vehicle 30 through the auxiliary power loop Lap. Accordingly, both the zero-voltage turning on and the zero-current turning on are realized to minimize the output current of the electric vehicle 30 and softly switch the switches of the relay apparatuses 10, thus protecting the relay apparatuses 10; and 3. The inductance element 110 connected in series to the controllable switch 108 and the auxiliary relay 106 is used to restrain a changing rate of the current flowing through the auxiliary power loop Lap when the controllable switch 108 is turned on by the trigger control signal Stc, thus protecting the controllable switch 108.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. An electric vehicle supply equipment receiving an external AC power source, the electric vehicle supply equipment comprising:
   a relay apparatus comprising:
      at least one master relay connected to a master power loop;
      an auxiliary relay; and
      a controllable switch connected in series to the auxiliary relay to form a series branch, and connected to an auxiliary power loop, wherein the series branch is connected in parallel to the at least one master relay; and
   a controller configured to produce at least one master control signal, an auxiliary control signal, and a trigger control signal to correspondingly control the at least one master relay, the auxiliary relay, and the controllable switch,
   wherein when the controller is configured to detect the external AC power source, the auxiliary control signal is configured to turn on the auxiliary relay, and then the external AC power source is configured to supply power to an electric vehicle through the auxiliary power loop when the controller is configured to control the trigger control signal to turn on the controllable switch, and
   wherein the at least one master relay is turned on by the at least one master control signal after the electric vehicle is supplied power by the external AC power source, and then the controllable switch is turned off by the trigger control signal, and then the auxiliary relay is turned off by the auxiliary control signal while the at least one master relay remains on.

2. The electric vehicle supply equipment in claim 1, wherein the controller triggers to turn on the controllable switch when the external AC power source is not in a zero-crossing condition so that the zero-voltage turning on of the relay apparatus is achieved and the external AC power source is provided to supply power to the electric vehicle through the auxiliary power loop; the controller triggers to turn on the controllable switch when the external AC power source is in a zero-crossing condition so that the zero-current turning on of the relay apparatus is achieved and the external AC power source is provided to supply power to the electric vehicle through the auxiliary power loop.

3. The electric vehicle supply equipment in claim 1, wherein the electric vehicle is supplied power by the external AC power source through the auxiliary power loop, and the electric vehicle is supplied power by the external AC power source through the master power loop after the controllable switch is turned off and the auxiliary relay is turned off.

4. The electric vehicle supply equipment in claim 1, wherein when the master relay is a first master relay and the master control signal is a first master control signal, the first master relay is connected to an output terminal of the master power loop, and the series branch is connected in parallel to the first master relay.

5. The electric vehicle supply equipment in claim 1, wherein the relay apparatus further comprises:
   an inductance element connected in series to the series branch formed by the controllable switch and the auxiliary relay to restrain a changing rate of the current flowing through the auxiliary power loop when the controllable switch is turned on by the trigger control signal.

6. The electric vehicle supply equipment in claim 1, wherein the controllable switch is a silicon controlled rectifier (SCR), a triode AC semiconductor switch (TRIAC), or a diode for AC switch (DIAC).

7. An electric vehicle supply equipment receiving an external AC power source, the electric vehicle supply equipment comprising:
   a relay apparatus comprising:
      at least one master relay connected to a master power loop;
      an auxiliary relay; and
      a controllable switch connected in series to the auxiliary relay to form a series branch, and connected to an auxiliary power loop, wherein the series branch is connected in parallel to the at least one master relay; and
   a controller configured to produce at least one master control signal, an auxiliary control signal, and a trigger control signal to correspondingly control the at least one master relay, the auxiliary relay, and the controllable switch,
   wherein when the controller is configured to detect the external AC power source, the auxiliary control signal is configured to turn on the auxiliary relay, and then the external AC power source is configured to supply power to an electric vehicle through the auxiliary power loop when the controller is configured to control the trigger control signal to turn on the controllable switch, and
   wherein when the master relays are a first master relay and a second master relay and the master control signals are a first master control signal and a second master control signal, the first master relay is connected to an output terminal of the master power loop, the series branch is connected in parallel to the first master relay, and the second master relay is connected to another output terminal of the master power loop; when the controller detects the external AC power source, the auxiliary relay is turned on by the auxiliary control signal, and then the second master relay is turned on by the second master control signal, and then the controllable switch is turned on by the trigger control signal when the controller detects that the external AC power source is in a zero-crossing condition so that the electric vehicle is supplied power by the external AC power source through the auxiliary power loop.

8. An electric vehicle supply equipment receiving an external AC power source, the electric vehicle supply equipment comprising:
a relay apparatus comprising:
at least one master relay connected to a master power loop;
an auxiliary relay; and
a controllable switch connected in series to the auxiliary relay to form a series branch, and connected to an auxiliary power loop, wherein the series branch is connected in parallel to the at least one master relay; and
a controller configured to produce at least one master control signal, an auxiliary control signal, and a trigger control signal to correspondingly control the at least one master relay, the auxiliary relay, and the controllable switch,
wherein when the controller is configured to detect the external AC power source, the auxiliary control signal is configured to turn on the auxiliary relay, and then the external AC power source is configured to supply power to an electric vehicle through the auxiliary power loop when the controller is configured to control the trigger control signal to turn on the controllable switch, and
wherein when the master relays are a first master relay and a second master relay and the master control signals are a first master control signal and a second master control signal, the first master relay is connected to an output terminal of the master power loop, the series branch is connected in parallel to the first master relay, and the second master relay is connected to another output terminal of the master power loop; when the controller detects the external AC power source, the second master relay is turned on by the second master control signal, and then the auxiliary relay is turned on by the auxiliary control signal, and then the controllable switch is turned on by the trigger control signal when the controller detects that the external AC power source is in a zero-crossing condition so that the electric vehicle is supplied power by the external AC power source through the auxiliary power loop.

9. A method of operating an electric vehicle supply equipment, the electric vehicle supply equipment receiving an external AC power source, the method comprising:
providing a relay apparatus; wherein the relay apparatus has at least one master relay, an auxiliary relay, and a controllable switch; the at least one master relay is connected to a master power loop, and the auxiliary relay is connected in series to the controllable switch to form a series branch and connected to an auxiliary power loop;
providing a controller; wherein the controller is configured to produce at least one master control signal, an auxiliary control signal, and a trigger control signal to correspondingly control the at least one master relay, the auxiliary relay, and the controllable switch;
turning on the auxiliary relay by the auxiliary control signal when the controller is configured to detect the external AC power source; and
supplying power to an electric vehicle by the external AC power source through the auxiliary power loop when the controller is configured to control the trigger control signal to turn on the controllable switch,
turning on the at least one master relay by the at least one master control signal;
turning off the controllable switch by the trigger control signal; and
turning off the auxiliary relay by the auxiliary control signal so that the electric vehicle is supplied power by the external AC power source through the master power loop.

10. The method of operating the electric vehicle supply equipment in claim 9, wherein the controller triggers to turn on the controllable switch when the external AC power source is not in a zero-crossing condition so that the zero-voltage turning on of the relay apparatus is achieved and the external AC power source is provided to supply power to the electric vehicle through the auxiliary power loop; the controller triggers to turn on the controllable switch when the external AC power source is in a zero-crossing condition so that the zero-current turning on of the relay apparatus is achieved and the external AC power source is provided to supply power to the electric vehicle through the auxiliary power loop.

11. The method of operating the electric vehicle supply equipment in claim 9, wherein when the master relay is a first master relay and the master control signal is a first master control signal, the first master relay is connected to an output terminal of the master power loop, and the series branch is connected in parallel to the first master relay.

12. A method of operating an electric vehicle supply equipment, the electric vehicle supply equipment receiving an external AC power source, and the method comprising following steps:
providing a relay apparatus; wherein the relay apparatus has at least one master relay, an auxiliary relay, and a controllable switch; the at least one master relay is connected to a master power loop, and the auxiliary relay is connected in series to the controllable switch to form a series branch and connected to an auxiliary power loop;
providing a controller; wherein the controller is configured to produce at least one master control signal, an auxiliary control signal, and a trigger control signal to correspondingly control the at least one master relay, the auxiliary relay, and the controllable switch;
turning on the auxiliary relay by the auxiliary control signal when the controller is configured to detect the external AC power source; and
supplying power to an electric vehicle by the external AC power source through the auxiliary power loop when the controller is configured to control the trigger control signal to turn on the controllable switch,
wherein when the master relays are a first master relay and a second master relay and the master control signals are a first master control signal and a second master control signal, the first master relay is connected to an output terminal of the master power loop, the series branch is connected in parallel to the first master relay, and the second master relay is connected to another output terminal of the master power loop; when the controller detects the external AC power source, the auxiliary relay is turned on by the auxiliary control signal, and then the second master relay is turned on by the second master control signal, and then the controllable switch is turned on by the trigger control signal when the controller detects that the external AC power source is in a zero-crossing condition so that the electric vehicle is supplied power by the external AC power source through the auxiliary power loop.

13. A method of operating an electric vehicle supply equipment, the electric vehicle supply equipment receiving an external AC power source, and the method comprising following steps:
 providing a relay apparatus; wherein the relay apparatus has at least one master relay, an auxiliary relay, and a controllable switch; the at least one master relay is connected to a master power loop, and the auxiliary relay is connected in series to the controllable switch to form a series branch and connected to an auxiliary power loop;
 providing a controller; wherein the controller is configured to produce at least one master control signal, an auxiliary control signal, and a trigger control signal to correspondingly control the at least one master relay, the auxiliary relay, and the controllable switch;
 turning on the auxiliary relay by the auxiliary control signal when the controller is configured to detect the external AC power source; and
 supplying power to an electric vehicle by the external AC power source through the auxiliary power loop when the controller is configured to control the trigger control signal to turn on the controllable switch,
 wherein when the master relays are a first master relay and a second master relay and the master control signals are a first master control signal and a second master control signal, the first master relay is connected to an output terminal of the master power loop, the series branch is connected in parallel to the first master relay, and the second master relay is connected to another output terminal of the master power loop; when the controller detects the external AC power source, the second master relay is turned on by the second master control signal, and then the auxiliary relay is turned on by the auxiliary control signal, and then the controllable switch is turned on by the trigger control signal when the controller detects that the external AC power source is in a zero-crossing condition so that the electric vehicle is supplied power by the external AC power source through the auxiliary power loop.

14. The method of operating the electric vehicle supply equipment in claim 9, wherein the relay apparatus further comprises:
 an inductance element connected in series to the series branch formed by the controllable switch and the auxiliary relay to restrain a changing rate of the current flowing through the auxiliary power loop when the controllable switch is turned on by the trigger control signal.

15. The method of operating the electric vehicle supply equipment in claim 9, wherein the controllable switch is a silicon controlled rectifier (SCR), a triode AC semiconductor switch (TRIAC), or a diode for AC switch (DIAC).

* * * * *